(12) United States Patent
Lemaire et al.

(10) Patent No.: US 9,416,843 B2
(45) Date of Patent: Aug. 16, 2016

(54) HYDRAULIC VIBRATION-DAMPING SUPPORT

(71) Applicant: HUTCHINSON, Paris (FR)

(72) Inventors: Gabriel Lemaire, Saint-Denis-les-Ponts (FR); Alain Bellamy, Ambloy (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 14/622,390

(22) Filed: Feb. 13, 2015

(65) Prior Publication Data

US 2015/0233443 A1 Aug. 20, 2015

(30) Foreign Application Priority Data

Feb. 14, 2014 (FR) ...................................... 14 51154

(51) Int. Cl.
| | |
|---|---|
| F16F 13/04 | (2006.01) |
| F16F 13/26 | (2006.01) |
| F16F 13/10 | (2006.01) |
| F16F 13/20 | (2006.01) |

(52) U.S. Cl.
CPC ................. *F16F 13/10* (2013.01); *F16F 13/20* (2013.01); *F16F 13/26* (2013.01); *F16F 13/268* (2013.01)

(58) Field of Classification Search
CPC ......... F16F 13/26; F16F 13/264; F16F 13/10; F16F 13/106; F16F 13/262; F16F 13/266; F16F 13/268; F16F 13/105; F16F 13/107
See application file for complete search history.

(56) References Cited

U.S. PATENT DOCUMENTS

| | | | | |
|---|---|---|---|---|
| 5,246,212 A | * | 9/1993 | Funahashi | ............... F16F 13/26 180/312 |
| 5,386,977 A | * | 2/1995 | Quast | ...................... F16F 13/26 267/140.13 |
| 6,017,024 A | * | 1/2000 | Muramatsu | ............. F16F 13/20 267/140.14 |
| 7,448,605 B2 | * | 11/2008 | Bretaudeau | ........... F16F 13/268 267/140.14 |
| 7,648,129 B2 | * | 1/2010 | Muraoka | ............... F16F 13/105 267/140.11 |
| 2004/0188904 A1 | * | 9/2004 | Ichikawa | ............... F16F 13/264 267/140.14 |
| 2005/0127585 A1 | * | 6/2005 | Maeno | ................... F16F 13/264 267/140.11 |
| 2006/0006593 A1 | | 1/2006 | Bretaudeau | |
| 2008/0023897 A1 | | 1/2008 | Muraoka | |
| 2013/0161885 A1 | * | 6/2013 | Marienfeld | ........... F16F 13/266 267/140.14 |

FOREIGN PATENT DOCUMENTS

JP 2010 048350 A 3/2010

OTHER PUBLICATIONS

Search report for related French Application No. 14 51154; report dated Oct. 15, 2014.

* cited by examiner

*Primary Examiner* — Anna Momper
*Assistant Examiner* — Stephen Bowes
(74) *Attorney, Agent, or Firm* — Miller, Matthias & Hull LLP

(57) ABSTRACT

Controllable hydraulic vibration-damping support comprising a main hydraulic circuit comprising a working chamber, a compensation chamber, and a first constricted passageway, and an auxiliary hydraulic chamber separated from the working chamber by a decoupling valve and communicating with the main hydraulic circuit by means of a second constricted passageway having a resonance frequency of less than 5 Hz. The auxiliary chamber is separated from a pneumatic chamber by a movable wall, and a control device is provided for selectively either connecting the pneumatic chamber to the open air, or bleeding air from the pneumatic chamber.

6 Claims, 3 Drawing Sheets

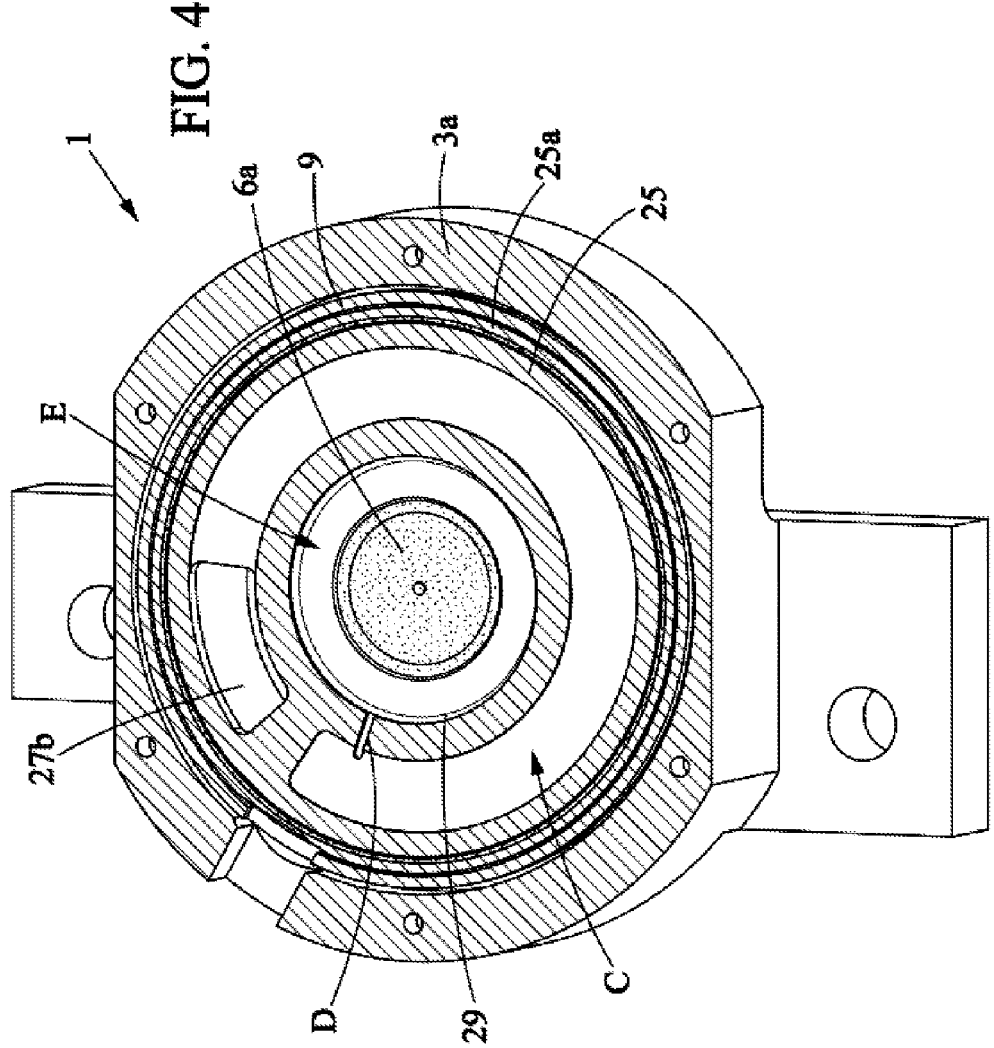

HYDRAULIC VIBRATION-DAMPING SUPPORT

CROSS-REFERENCE TO RELATED APPLICATION

This application claims priority under the Paris Convention to French Patent Application No. 14 51154 filed on Feb. 14, 2014.

FIELD OF THE DISCLOSURE

The present invention relates to controllable hydraulic vibration-damping supports.

BACKGROUND OF THE DISCLOSURE

More particularly, the invention relates to a controllable hydraulic vibration-damping support intended to be interposed for damping purposes between first and second rigid elements, said vibration-damping support comprising:
- first and second strength members adapted to be secured to two rigid elements to be connected together,
- an elastomer body which connects the first and second strength members and which delimits, at least in part, a working chamber,
- a deformable compensation chamber which communicates with the working chamber via a first constricted passageway, the compensation chamber, working chamber, and first constricted passageway forming a hydraulic volume filled with liquid, the first constricted passageway having a resonance frequency of between 5 and 20 Hz,
- an auxiliary chamber,
- a decoupling valve comprising: an elastomeric isolating diaphragm which separates the working chamber and the auxiliary chamber; and first and second stop gates respectively communicating with the working chamber and with the auxiliary chamber, the isolating diaphragm being arranged between the first and second stop gates and distanced from each stop gate to allow it to travel freely between said first and second stop gates,
- a control device adapted for selectively locking the isolating diaphragm.

Document EP-A-0115417 discloses a vibration-damping support of this type, where the auxiliary chamber is a pneumatic chamber and the control device can selectively isolate or connect this auxiliary chamber to the open air.

The object of the present invention is to improve the effectiveness of vibration-damping supports of this type.

SUMMARY OF THE DISCLOSURE

To this end, according to the invention a vibration-damping support of the kind in question is characterized in that the auxiliary chamber is filled with liquid and communicates with said hydraulic volume via a second constricted passageway having a resonance frequency of less than 5 Hz, in that it further comprises a pneumatic control chamber separated from the auxiliary chamber by a movable wall, and in that the control device is adapted for selectively either connecting said pneumatic control chamber to the open air or bleeding air from said pneumatic control chamber so as to lock said movable wall.

With these arrangements, the function of limiting the travel of the isolating diaphragm and the decoupling deactivation function are separated, which allows:

- optimizing the movement of the isolating diaphragm, particularly so that it does not interfere with the operation of the first constricted passageway (generally we want to limit the travel of the isolating diaphragm to less than 1 mm, or even to less than 0.5 mm),
- and optimizing the deactivation of the decoupling by allowing greater travel for said movable wall, which greatly limits the volume of air remaining in the pneumatic chamber when bleeding air from it.

In addition, the auxiliary chamber is always at the same static or quasistatic pressure as the working chamber, due to the presence of the second constricted passageway, so the isolating diaphragm is always substantially equidistant from the two stop gates, which allows optimum operation of the decoupling valve. In addition, the second constricted passageway is sized so that it is neutralized at the relatively high frequencies concerned by the decoupling, so that it does not interfere with operation of the decoupling valve.

In various embodiments of the vibration-damping support according to the invention, one or more of the following arrangements may be used:
- the control device comprises an air check valve normally only allowing air to escape from the pneumatic control chamber to the atmosphere and not the reverse, and a venting device selectively operable to connect said pneumatic control chamber to the open air;
- the pneumatic control chamber is delimited between a dome and the movable wall which is an elastomeric control membrane, the air check valve communicating with the pneumatic control chamber by an opening in the dome and the control membrane being adapted to press against the dome under the effect of the air check valve when the venting device is not actuated;
- the compensation chamber is separated from the working chamber by a rigid partition which is integral with the second strength member, said rigid partition comprising the stop gates, first constricted passageway, second constricted passageway, auxiliary chamber, and isolating diaphragm;
- the rigid partition comprises first and second superimposed plates, the first plate comprising the first stop gate, the second stop gate being clamped between the first and second plates, the second plate comprising an opening arranged in correspondence with the auxiliary chamber and sealed closed by said movable wall formed by an elastomeric control membrane;
- the isolating diaphragm is mounted between the first and second stop gates with a clearance of less than 1 mm relative to each gate, and the movable wall is able to travel several millimeters relative to its middle position.

Other features and advantages of the invention will become apparent from the following description of one of its embodiments, given by way of non-limiting example with reference to the accompanying drawings.

BRIEF DESCRIPTION OF THE DRAWINGS

In the drawings:

FIG. 4 is a radial sectional view of the vibration-damping support of FIGS. 1 and 2.

In the various figures, identical references denote identical or similar elements.

DETAILED DESCRIPTION

Figure 1:
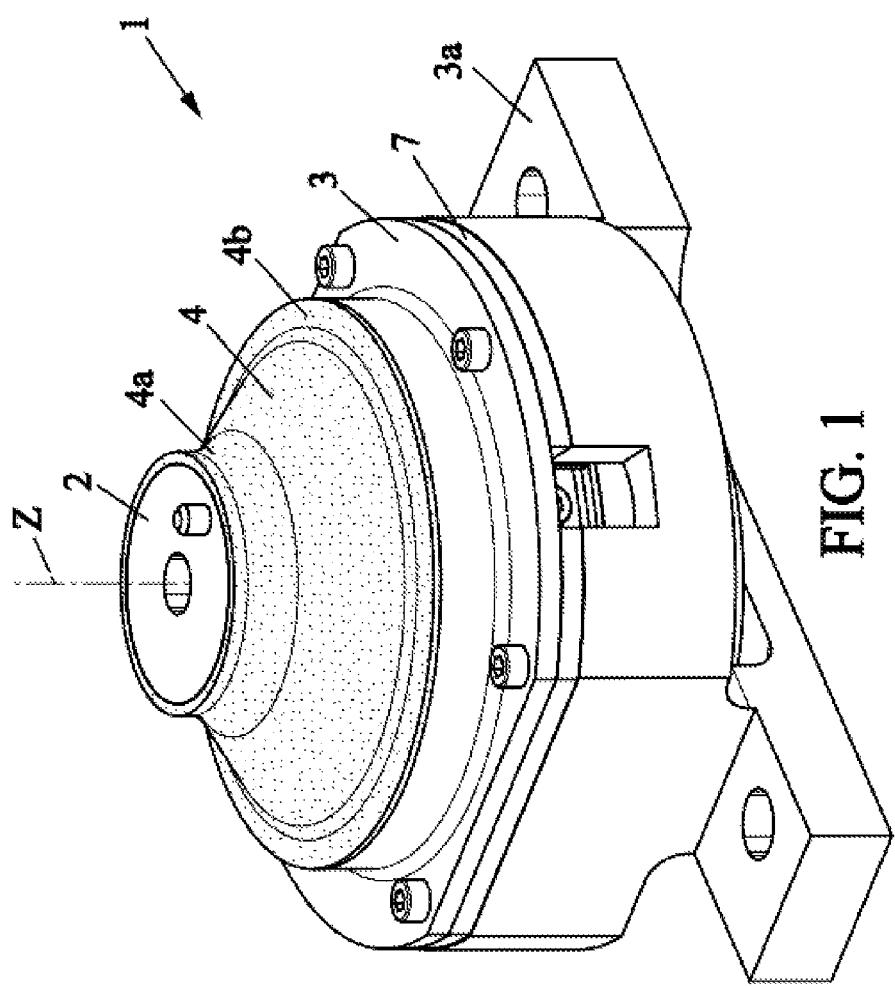
FIG. 1 is a perspective view of a vibration-damping support according to one embodiment of the invention.

FIG. 1 represents a controllable hydraulic vibration-damping support 1, comprising:
- a first rigid strength member 2 having for example the form of a metal base plate and intended to be attached for example to the engine of a vehicle,
- a second rigid strength member 3, for example an annular strength member of metal or plastic, which is intended to be attached for example directly to the body of the vehicle by means of at least one attachment member 3a,
- an elastomer body 4 capable of withstanding the static forces due to the weight of the vehicle engine and connecting the first and second strength members 2, 3, said elastomer body possibly having for example a bell shape extending axially for example along a vertical axis Z, between a top 4a bonded and molded onto the first strength member 2 and an annular base 4b molded and bonded onto the second strength member 3.

Figure 2:
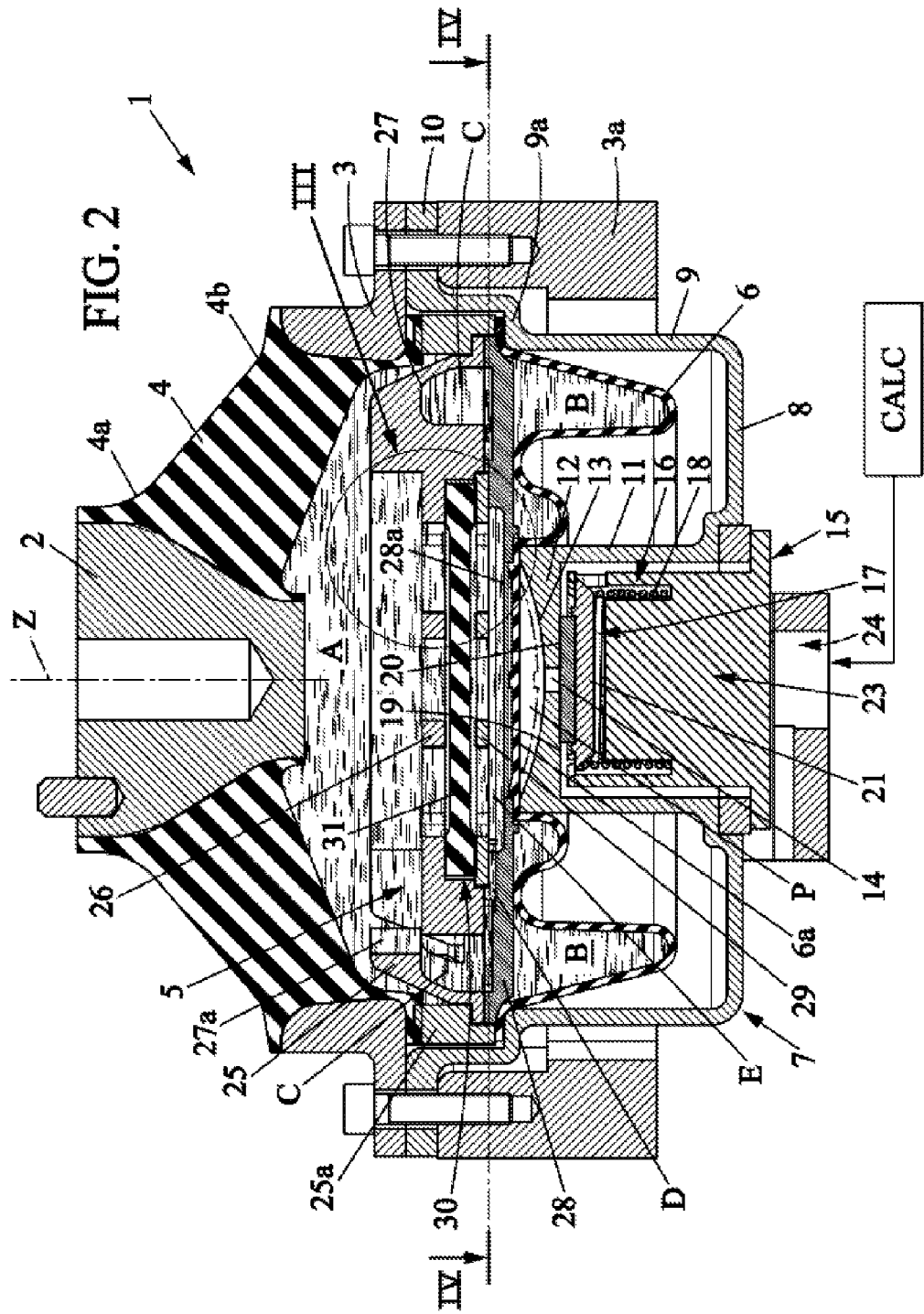
FIG. 2 is an axial sectional view of the vibration-damping support of FIG. 1.

As represented in FIG. 2, the vibration-damping support 1 further comprises a rigid partition 5 integral with the second strength member 3 and sealingly applied against the base 4b of the elastomer body, delimiting therewith a hydraulic working chamber A. A flexible elastomeric membrane 6 forming a bellows is sealingly applied against the partition 5 on the side opposite the working chamber A, delimiting with said partition 5 a hydraulic compensation chamber B which communicates with the working chamber A by a constricted passageway C. The working chamber, compensation chamber B, and constricted passageway C together form a hydraulic volume filled with fluid, in particular glycol or some other fluid.

The constricted passageway C is sized to have a resonance frequency of between 5 and 20 Hz, typically between 8 and 12 Hz.

As shown in FIGS. 2 and 4, the vibration-damping support 1 further comprises a hydraulic auxiliary chamber E, filled with liquid, which communicates with said hydraulic volume A, B, C by another constricted passageway D which itself is filled with liquid. The constricted passageway D has a very small cross-section, and is sized to have a resonance frequency below 5 Hz, for example approximately 1 to 2 Hz (the cutoff frequency for this passageway D, particularly the cutoff frequency at 3 dB, is also less than 5 Hz). More particularly, constricted passageway D communicates with constricted passageway C in the example considered here. This constricted passageway D could also be in the form of a small hole (not shown) provided in the isolating diaphragm 31 which will be described below.

The vibration-damping support 1 comprises a pneumatic chamber P separated from the auxiliary chamber E by a movable wall which can have any of the known forms (such as a piston, flexible membrane, or some other form). In the example considered here, the movable wall is a flexible elastomeric control membrane, and this control membrane may advantageously be a part 6a of said membrane 6, particularly a central part 6a of the membrane 6.

In the example shown in FIG. 1, the hydraulic vibration-damping support comprises a cover 7, made for example of molded plastic, which covers the bellows 6 at the bottom.

In the example shown, the cover 7 may comprise an annular base 8 with its outer periphery extending upwards in an annular side wall 9, said side wall 9 then forming an annular protrusion 9a and terminating in an outer annular flange 10 which may, for example, be sandwiched between the second strength member 3 and the attachment member 3a, which are secured together by any known means, for example by screws.

The cover 7 may further comprise an inner annular wall 11 which extends upwardly from the inner periphery of the base 8. This inner annular wall 11 is extended by a radial wall 12 which delimits the bottom portion of the pneumatic control chamber P.

More particularly, the upper face 13 of the radial wall 12 may be concave, forming a dome delimiting said pneumatic control chamber P.

In the example shown, the rigid partition 5 and the outer periphery of the membrane 6 are clamped between the base 4b of the elastomer body 4 and the protrusion 9a of the cover, while the periphery of part 6a of the membrane 6 is clamped between the periphery of the radial wall 12 and the rigid partition 5.

The pneumatic chamber P communicates with the atmosphere via an opening 14 in the radial wall 12 of the cover 7, and via a control device 15 attached to the inside of said inner annular wall 11 of the cover 7.

This control device 15 comprises an air check valve 16 which is adapted, during normal operation (in other words when not forced open), to only allow air to escape from the pneumatic chamber P to the atmosphere and not the reverse. The air check valve 16 may comprise a valve member 17 which is resiliently biased by a spring 18 so that it is pressed against a valve seat 19. In the example considered here, the valve seat 19 is formed by the lower face of the annular wall 12.

The dead volume defined within the opening 14 between the inner surface 13 and the valve seat 19 is thus minimized. This dead volume is preferably between 0 and 0.3 cm$^3$.

The valve member 17 may comprise, for example:
- a gasket 20 of elastomer or other material, suitable to form a fluidtight seal when applied against the valve seat 19,
- a slider 21 having at least one ferromagnetic part, carrying the gasket 20 and biased toward the radial wall 12 by the spring 18.

The control device 15 further comprises an electromagnet 23, connected for example by an electrical connector 24 to external control means that are part of the vehicle, such as the onboard computer CALC. When ordered to do so by the computer CALC, the electromagnet 23 produces a magnetic field that pulls the valve member 17 away from the valve seat 19, placing the pneumatic chamber P in communication with the atmosphere. One will note that the electromagnet 23 could be replaced by any other actuator, particularly electrical or pneumatic.

Figure 3:
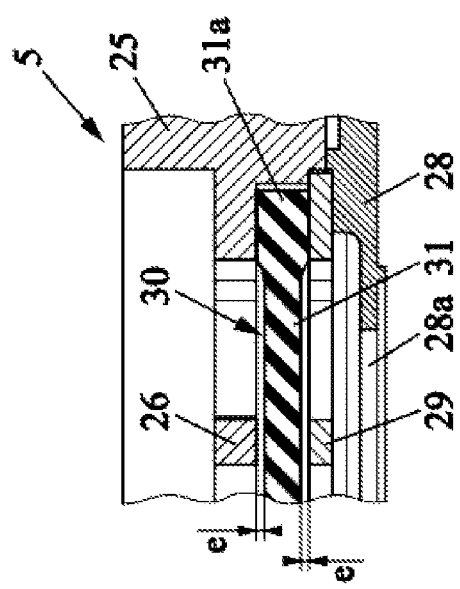
FIG. 3 is an enlarged view of the detail indicated by III in FIG. 2.

Furthermore, in the example shown in FIGS. 2 and 3, the rigid partition 5 may comprise three superimposed radial plates, made of metal or plastic and clamped between the base 4b of the elastomer body and the projection 9a of the cover:
- a first plate 25 arranged near the working chamber A and at its center forming a disk-shaped first stop gate 26, said first plate 25 having along its outer periphery a channel 27 which is open for its entire length facing away from the working chamber A and which also comprises an opening 27a to the working chamber,
- a second disk-shaped stop gate 29, arranged in correspondence with the first gate 26 under the first plate 25,
- A second annular plate 28 arranged under the first plate 25 and the second stop gate 29, having a central opening 28a in correspondence with the control membrane 6a and the stop gates 26, 29, the second plate comprising an opening arranged in correspondence with the auxiliary chamber and sealed closed by part 6a of the membrane 6.

The second plate 28 delimits the constricted passageway C with the first plate 25, and comprises an opening 27b (FIG. 4) which places constricted passageway C in communication with compensation chamber B.

The second plate 28 further comprises, on its upper face, a dome defining auxiliary chamber E, and a thin channel which defines constricted passageway D and places constricted passageway C in communication with auxiliary chamber E (see FIGS. 2 and 4).

The stop gates 26, 29 define between them a housing 30 in which is engaged an elastomeric isolating diaphragm 31 having any known form. As shown in more detail in FIG. 3, the isolating diaphragm 31 is mounted with some clearance e relative to each stop gate 26, 29, to allow it to travel freely between the stop gates 26, 29. The clearance e is typically on the order of a few tenths of a millimeter, for example about 0.5 mm. The isolating diaphragm 31 may be locally clamped between the stop gates 26, 29, for example at the periphery 31a of said isolating diaphragm 31. The stop gates 26, 29 and the isolating diaphragm 31 together form a decoupling valve whose function is to absorb vibrations of relatively high frequency (greater than 20 Hz) and relatively low amplitude (on the order of 0.5 mm and below). Because of the second constricted passageway D, the auxiliary chamber E is always at the same pressure as the working chamber when the vehicle is not running, so that this clearance e is maintained on either side of the isolating diaphragm in spite of the pressure created in the working chamber by the weight of the vehicle's engine.

The device described above operates as follows.

When the engine of the vehicle is operating under certain predefined conditions, for example at idle, the vehicle's computer activates the electromagnet 23 to open the air check valve 16, placing the pneumatic chamber P in communication with the atmosphere which allows the membrane 6a to move freely: in this mode, the engine vibrations are transmitted to the working chamber A by the elastomer body 4, causing fluctuations in the volume of said working chamber. These fluctuations, of a frequency exceeding 20 Hz and of relatively low amplitude, are absorbed by the decoupling valve 26, 29, 31.

Under other predefined conditions, for example when the vehicle is moving (in other words when the engine speed exceeds a certain predetermined limit), the computer of the vehicle stops activating the electromagnet, so that the air check valve 16 is returned to the closed position by the action of the spring 18. In this operating mode, the vibratory movements of the engine, of relatively large amplitude and of a frequency generally between 5 and 20 Hz, in particular between 8 and 12 Hz (called "shaking" movements), result in changes in the volume of the working chamber A that are of relatively large amplitude, causing deformations of the compensation chamber B such that the constricted passageway C is then the seat of resonance phenomena allowing the damping of vibrations under good conditions.

In addition, in the early stages of this operating mode, the pneumatic chamber P still contains air, which allows part 6a of the membrane 6 to move but these movements expel air from the pneumatic chamber P through the air check valve 16. When almost all the air contained in the chamber P has been expelled, part 6a of the membrane 6 remains substantially pressed against the upper surface of the radial wall 12 (position indicated with dotted lines in FIG. 2), and the auxiliary hydraulic chamber E therefore can no longer deform. In addition, the liquid does not pass through constricted passageway D at shaking frequencies, so that the isolating diaphragm is immobilized. The decoupling valve is therefore disabled in this mode. Note that part 6a of the membrane 6 can travel several millimeters relative to its middle position, thereby optimizing the effectiveness of the decoupling valve deactivation.

The vibration-damping support described above is particularly suitable for 3-cylinder engines or engines having 3-cylinder operating modes.

The invention claimed is:

1. A controllable hydraulic vibration-damping support intended to be interposed for damping purposes between first and second rigid elements, said vibration-damping support comprising:
    first and second strength members adapted to be secured to the first and second rigid elements
    an elastomer body which connects the first and second strength members and which delimits, at least in part, a working chamber,
    a deformable compensation chamber which communicates with the working chamber via a first constricted passageway, the compensation chamber, working chamber, and first constricted passageway forming a hydraulic volume filled with liquid, the first constricted passageway having a resonance frequency of between 5 and 20 Hz,
    an auxiliary chamber,
    a decoupling valve comprising: an elastomeric isolating diaphragm, a first stop gate and a second stop gate,
        wherein the elastomeric isolating diaphragm separates the working chamber and the auxiliary chamber, and the first and second stop gates respectively communicate with the working chamber and with the auxiliary chamber, the isolating diaphragm being arranged between the first and second stop gates and distanced from each stop gate to allow it to travel freely between said first and second stop gates
    a control device adapted for selectively locking the isolating diaphragm,
    wherein the auxiliary chamber is filled with liquid and communicates with said hydraulic volume via a second constricted passageway having a resonance frequency of less than 5 Hz,
    wherein it further comprises a pneumatic control chamber separated from the auxiliary chamber by a movable wall,
    and wherein the control device is adapted for selectively connecting or disconnecting said pneumatic control chamber to the open air.

2. The vibration-damping support according to claim 1, wherein the control device comprises an air check valve normally only allowing air to escape from the pneumatic control chamber to the atmosphere and not the reverse, and a venting device selectively operable to connect said pneumatic control chamber to the open air.

3. The vibration-damping support according to claim 2, wherein the pneumatic control chamber is delimited between a dome and the movable wall which is an elastomeric control membrane, the air check valve communicating with the pneumatic control chamber by an opening in the dome and the control membrane being adapted to press against the dome.

4. The vibration-damping support according to claim 1, wherein the compensation chamber is separated from the working chamber by a rigid partition which is integral with the second strength member, said rigid partition comprising the first and second stop gates, first constricted passageway, second constricted passageway, auxiliary chamber, and isolating diaphragm.

5. The vibration-damping support according to claim 4, wherein the rigid partition comprises first and second superimposed plates, the first plate comprising the, first stop gate, the second stop gate being clamped between the first and second plates, the second plate comprising an opening arranged in correspondence with the auxiliary chamber and sealed closed by said movable wall formed by an elastomeric control membrane.

6. The vibration-damping support according to claim 1, wherein the isolating diaphragm is mounted between the first and second stop gates with a clearance of less than 1 mm relative to each gate, and the movable wall is able to travel several millimeters relative to its middle position.

* * * * *